United States Patent [19]

Zaccone

[11] Patent Number: 4,714,138

[45] Date of Patent: Dec. 22, 1987

[54] ENGINE SUMP DRAINING DEVICE

[76] Inventor: Samuel G. Zaccone, 1315 N. 13th Ave., Melrose Park, Ill. 60160

[21] Appl. No.: 903,704

[22] Filed: Sep. 5, 1986

[51] Int. Cl.⁴ .......... F16D 3/14; F16D 1/12

[52] U.S. Cl. .......... 184/1.5; 403/159; 403/79; 141/311 R; 7/100; 7/138; 81/121.1; 81/3.4; 137/320

[58] Field of Search .......... 184/1.5, 105.1; 81/177.1, 121.1, 177.2, 3.4, 177.8; 7/100, 138, 165, 170; 403/57, 79, 157, 159; 141/1, 311 R, 331, 340; 137/320, 577, 579, 615

[56] References Cited

U.S. PATENT DOCUMENTS

| | | | |
|---|---|---|---|
| 1,994,844 | 3/1935 | Winger | 184/1.5 |
| 2,746,330 | 5/1956 | Pfetzing | 184/1.5 |
| 3,049,334 | 8/1962 | Montague | 184/1.5 |
| 3,391,953 | 7/1968 | Jordan | 403/157 |
| 4,090,797 | 5/1978 | Hufford | 403/157 |
| 4,098,398 | 7/1978 | Meyers | 184/1.5 |
| 4,472,075 | 9/1984 | Forni | 403/157 |

FOREIGN PATENT DOCUMENTS

| | | | |
|---|---|---|---|
| 318972 | 3/1957 | Fed. Rep. of Germany | 184/1.5 |
| 2578908 | 9/1986 | France | 184/1.5 |
| 581000 | 11/1977 | U.S.S.R. | 184/1.5 |

*Primary Examiner*—Carlton R. Croyle
*Assistant Examiner*—Jane Obee
*Attorney, Agent, or Firm*—Edmond T. Patnaude

[57] ABSTRACT

A device for draining an engine sump of the type having a threaded drain plug comprises a cup-like container having a flexible flange surrounding the open end thereof. The flange is provided with a gasket for forming a fluid tight seal between the sump and the container and with magnet means for adhering the container to the sump. A shaft carrying a socket on one end extends into the container and is sealably movable with respect thereto. Once the container is placed in position over a drain plug, the plug can be engaged and removed by manually turning a handle provided on the other end of the shaft. After removal of the plug, oil from the sump drains from a tube at the bottom of the container whereby contact with the oil by the service person is completely avoided.

2 Claims, 6 Drawing Figures

ENGINE SUMP DRAINING DEVICE

BACKGROUND OF THE INVENTION

1. Field of the Invention

The present invention relates generally to a device for draining an engine sump of the type having a threaded drain plug, and it relates more particularly to a novel device which permits the convenient draining of an engine sump without requiring the service person to in any way contact engine oil during removal of the drain plug from the sump.

2. Description of the Prior Art

In order to properly maintain an internal combustion engine, it is necessary from time to time to drain and replace the lubricating oil contained within the engine crankcase or sump. To facilitate such maintenance, a typical internal combustion engine is provided with a drain plug disposed at the lowermost position on the sump. The usual drain plug is a bolt-like member having a male threaded portion and a hexagonally shaped head which is dimensioned to be gripped by a conventional wrench or socket tool of standard size. The plug is received by a reinforced hole in the engine oil pan and is typically sealed by an annular gasket interposed between the head of the plug and the outer surface of the pan.

One of the inconveniences associated with removal of a plug of the foregoing type is that a sudden deluge of engine oil issues from the sump upon unscrewing the plug and removing it from its aperture. Invariably, even the most careful service person comes into contact with the engine oil upon extraction of the plug and, if the engine is at its normal operating temperature, the oil can be at a temperature high enough to scald the service person.

As a solution to the problems associated with contacting spent crankcase oil during an oil change, crankcase drain valves are known which can be installed in place of the typical drain plug. One such valve is disclosed, for example, in U.S. Pat. No. 3,874,478 issued to Mantell, Jr. on Apr. 1, 1975 and includes a valve body screwed into the usual female threaded aperture of the oil pan together with a valve core which, when removed, permits the crankcase oil to be drained into a disposable oil bag through which the valve core extends. With such a system, the service person need not come into contact with the crankcase oil because the disposable bag is first mounted around the valve body with the valve core sealably extending through the bag for manual retraction of the core by gripping it externally of the bag. While the foregoing system provides one solution to the problem of conveniently draining a crankcase sump, it would be desirable to provide a device which likewise permits the draining of a crankcase sump without exposing the service person to contact with the drain oil, but which does not require the use of a specialized pre-installed valve mechanism, whereby the device is capable of being used with originally equipped internal combustion engines of various types.

SUMMARY OF THE INVENTION

Briefly, there is provided in accordance with the teachings of the present invention a novel device for use in draining an engine sump of the type having a threaded drain plug on the side or bottom of the sump. This device comprises a cup-like housing having an open end for disposition over the drain plug and a closed end. A shaft having means in the form of a socket for removing the plug from the sump extends inwardly of the housing through the closed end thereof and is sealed for rotational and axial movement with respect to the housing by fluid tight sealing means such as a grommet. The housing is provided at its open end with a resiliently deformable flange having means for forming a fluid tight seal between the sump and the open end of the housing, and in a preferred embodiment includes means for adhering the housing to the sump. A conduit for carrying the drained fluid following removal of the plug from the sump extends from a location at the closed end of the housing.

In use, the device is positioned against the wall of the sump with the flange sealably pressed against an annular area of the sump, surrounding the drain plug and with the plug removing socket connected to the plug. Upon rotational movement of the shaft the plug is then unthreaded from its female aperture in the sump so that when the plug is fully retracted, oil drains from the sump into the housing and exits therefrom through the drain conduit. Since the housing is completely sealed to the sump, the device of the instant invention provides for removal of the drain plug without exposing the service person to contact with the drain oil.

BRIEF DESCRIPTION OF THE DRAWINGS

The foregoing and other novel features of the present invention will be better understood by a reading of the following detailed description taken in connection with the accompanying drawings wherein.

DETAILED DESCRIPTION OF THE INVENTION

Figure 1:
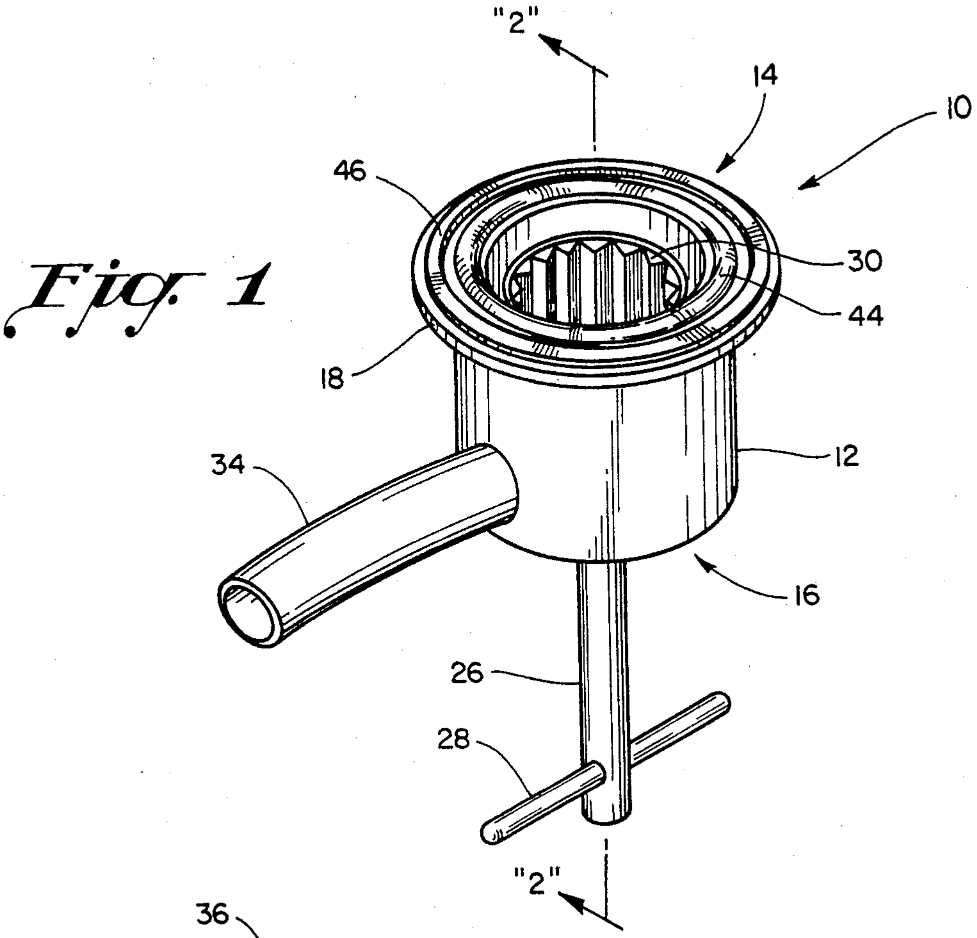
FIG. 1 is a perspective view of a device for draining an engine sump constructed in accordance with the principles of the invention.
Figure 2:
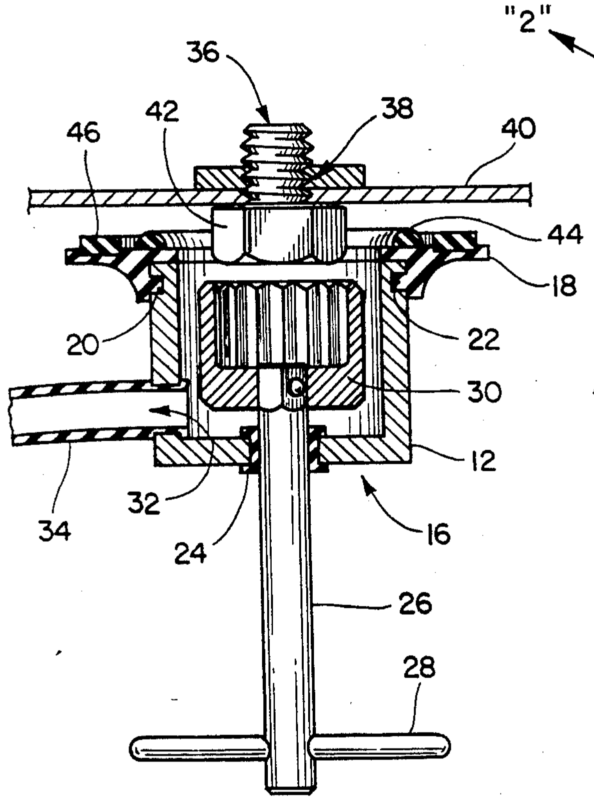
FIG. 2 is a cross-sectional view taken substantially along the lines 2—2 of FIG. 1 and illustrating the manner in which the device for draining an engine sump is associated with a typical crankcase drain plug of an internal combustion engine.

Referring now to the drawings, and initially to FIGS. 1 and 2, there is illustrated a device for draining an engine sump of an internal combustion engine designated generally by the reference numeral 10. The device includes as its principle component a generally cylindrical, cup-like housing 12. The housing 12 is preferably constructed of an impact resistant material such as steel or high impact plastic, and has an upwardly facing open end 14 and a lower closed end 16. At its open end 14, the housing 12 is fitted with a resiliently deformable flange 18 having a relatively high degree of flexibility. A suitable material for the flange 18 is neoprene rubber, for example, or another oil-resistant polymer. To connect the flange 18 to the housing 12, an annular groove 20 is formed in the housing 12 and the flange 18 is provided with an annular rib 22 which is sealably received by the groove 20. Positioned centrally of the closed end 16 of the housing 12 is a grommet 24 which provides a fluid-tight seal with a tool shaft 26 inserted therethrough. The grommet 24 is dimensioned to permit the shaft 26 to move axially and rotationally with respect to the housing 12. At its lowermost end, the shaft 26 is fitted with a suitable handle 28 and the opposite end of the shaft 26 disposed internally of the housing 12 is adapted for receiving a standard socket tool 30. Adjacent the closed end 14 of the housing 12 is a port 32 from which a suitable drain tube 34 extends.

As best seen in FIG. 2, when the device 10 is in use, it is positioned in axial alignment with a typical threaded drain plug 36 which is threadedly received by a female aperture 38 formed in an internal combustion engine sump 40. The plug 36 is of a type having a bolt-like head 42 for removal by a standard wrench or socket. With the device 10 positioned in coaxial alignment with the drain plug 36, the flange 18 completely circumscribes the head 42 of the drain plug 36. In order to effect a fluid-tight seal between the device 10 of the instant invention and the sump 40, the flange 18 is provided with an annular gasket 44. The gasket 44 is preferably of such a material as will easily conform to surface irregularities of the sump 40 while having the property of oil resistance. Adhered to the flange 18 in proximity to the gasket 44 is an annular piece of polymeric magnetic material 46 which serves to adhere the flange 18 to the sump 40 and to cause the gasket 44 to compress against the sump 40 forming a positive seal therebetween. As an alternative means to a polymeric magnetic material, segments of rigid ferrous magnets may be adhesively secured to the flange 18 at appropriate positions around the periphery thereof.

Figure 3:
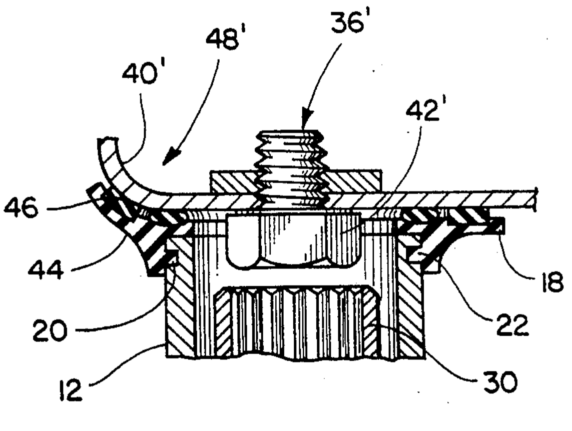
FIG. 3 is a cross-sectional view similar to FIG. 2 illustrating the use of a device in accordance with the principles of the invention in association with a crankcase sump having its drain plug positioned near a corner thereof.

In FIG. 3, the device 10 is illustrated in fully seated position against an internal combustion engine sump 48' designed with a corner 40' formed in proximity to a drain plug 36'. Because of the natural flexibility of the flange 18 as well as the adherence qualitites of the polymeric magnetic material 46, the flange 18 of the device 10 conforms to the shape of the sump corner 46' thereby effecting a fluid-tight seal around the entire periphery of the flange 18 for preventing oil leakage around the open end 14 of the housing 12 when oil is being drained from the internal combustion engine.

Figure 4:
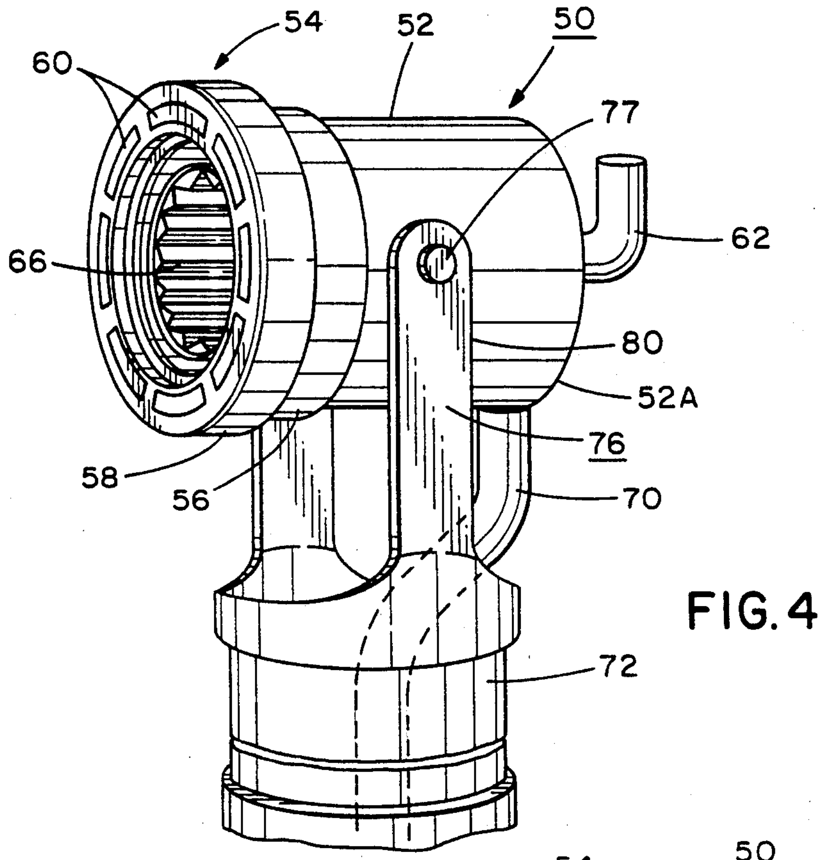
FIG. 4 is a perspective view of another embodiment of the invention.
Figure 5:
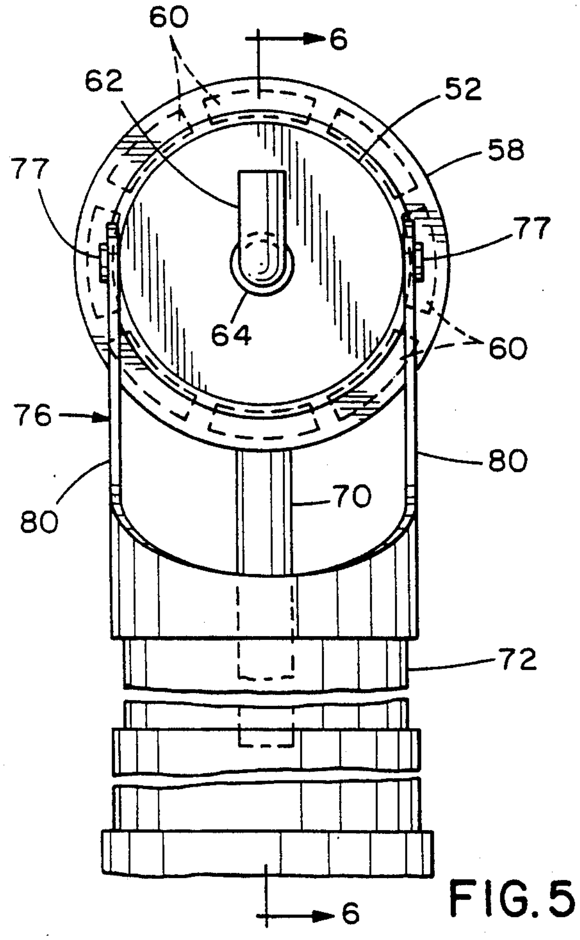
FIG. 5 is an end view of the device of FIG. 4 taken from the right side thereof as shown therein.

Referring now to FIGS. 4 and 5, an oil drain device 50 includes a cup-like housing 52 having a closed, circular end 52*a* and an open end over which a sealing member 54 is tightly and sealably fitted. The housing is formed of a rigid material such as metal or plastic, and the sealing member 54 is a molded elastomeric part which includes a tubular sleeve portion 56 which is removably mounted to the housing 52 to facilitate cleaning thereof.

As shown, the sealing member 54 is provided with an enlarged annular end portion 58 which is sufficiently soft so as to conform to the surface of a sump wall when pressed against it. Although the device 50 may be physically held against the sump for the service person, it is preferable to include in the device magnetic means for holding the end portion sealably against the sump during the oil draining operation. Accordingly, a plurality of permanent bar magnets 60 are embedded in the distal end of the sealing member 54, preferably at the time the housing 52 is initially molded.

Figure 6:
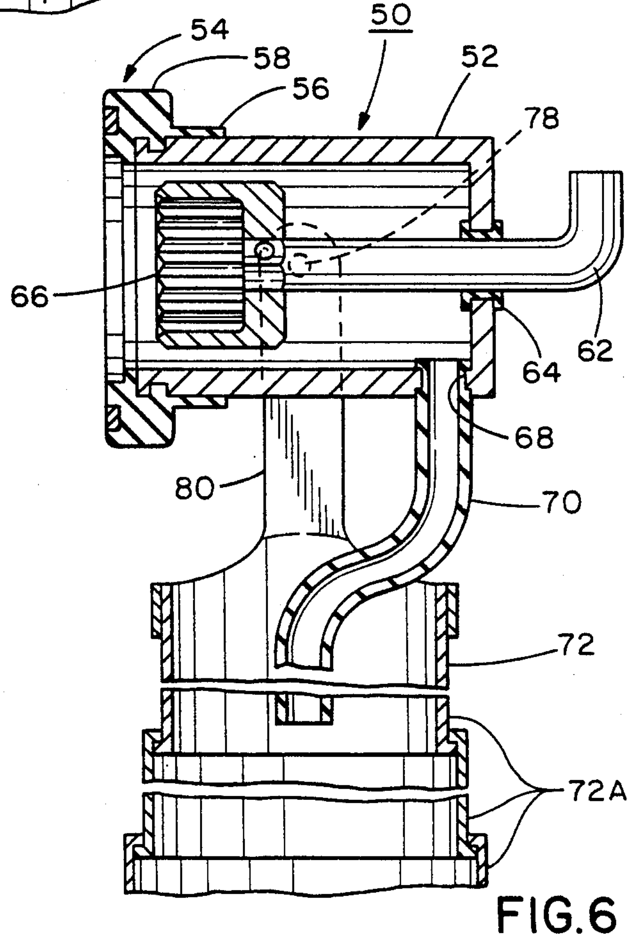
FIG. 6 is a cross-sectional view taken along the line 6—6 of FIG. 5.

A shaft 62 extends through a sealing grommet 64 mounted over a central opening in the end wall 52*a* of the housing 52 and a socket 66 is suitably mounted thereto within the housing 52 as shown in FIG. 6. A drain opening 68 is provided in the wall of the housing 52 adjacent the end wall 52*a* and a flexible conduit 70 extends therefrom into the upper end of a drain tube 72. Preferably, the tube 72 includes a plurality of telescopingly interfitted tube sections 72*a* which enable adjustment of the length of the tube 72 so that oil may be carried by the tube 72 directly to a suitable receptacle (not shown).

In order to permit use of the device 50 with either bottom or side mounted drain plugs, the upper open end of the tube 72 is secured to the housing 52 by means of a yoke 76 which is pivotably mounted to the housing by a pair of axially aligned pintles 77. As may be seen from the drawing, the yoke 76 includes upstanding arms 80 through which the pintles 77 respectively extend to permit swivelling of the yoke 76 between the position illustrated in the drawing to a position wherein the tube 72 is aligned with the axis of the shaft 62. The flexibility of the tube 70 permits insertion thereof into the tube 72 irrespective of the position of the yoke 76.

Operation

In operation, the device 10 is positioned against the sump 40 with the flange 18 surrounding the head 42 of the drain plug 46 whereupon the magnetic material 46 adheres the flange 18 to the sump 40. The handle 28 of the tool shaft 26 is then manually grasped and moved axially with respect to the housing 12 until the socket 30 comes into contact with the head 42 of the drain plug 36. The shaft 26 is rotated slightly until the socket 30 is angularly positioned for receiving the head 42 of the drain plug 36 and the shaft 26 can be rotated to unscrew the drain plug 36 from its aperture 38. When the plug 36 has become fully unthreaded, it may be retracted with the socket 30 to any desired vertical position within the housing 12, as viewed in FIG. 2, for example, whereupon oil issuing from the sump aperture 38 will flow around the socket 30 and will exit the housing 12 through the drain tube 34. The drain tube 34 may be positioned over a suitable recepticle (not shown) for discarding the oil once the sump 40 has been fully emptied. As an important feature of the instant device 10, the rate of flow of oil issuing from the sump 40 can be completely controlled by the manual positioning of the drain plug 36 with respect to the aperture 32 of the sump. Such control is effected by manual movement of the drain plug 36 either closer to or farther away from the aperture 38 of the sump 40 after the plug 36 has been fully unthreaded from the aperture 38.

Upon completion of the oil draining process, the drain plug 38 may be reinstalled in its aperture 38 while the device 10 is in mounted disposition on the sump 40 by combined upward and rotational movement of the shaft 26 which rethreads the plug 36 in its aperture 38. After the drain plug 36 is fully tightened, the device 10 may be removed from the sump 40 by manually grasping the housing 12 and pulling it downwardly, as viewed in FIG. 2, whereupon the magnetic polymeric material 46 releases from the sump 40 and the device 10 is freed from its mounted position.

It can be appreciated that the device 10 of the instant invention provides a simple and convenient means for draining the sump of an internal combustion engine without requiring the service person to come in physical contact with the drain oil. Accordingly, oil which has been heated to an elevated temperature, such as a typical operating temperature of an engine, may be easily drained without risk of harm to the service person. Moreover, the device 10 is usable with virtually any internal combustion engine having a threaded drain plug because the shaft 26 is designed to accept sockets 30 of differing sizes corresponding to the particular size of the drain plug head 42 of the specific sump intended to be drained.

The device 50 may be used in essentially the same manner as the use of the device 10 is described hereinabove.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed as new and desired to be secured under Letters Patent of the United States is:

1. A device for draining fluid from an engine sump of the type having a threaded drain plug comprising:

a housing having an open end and a closed end;

annular sealing means mounted to said housing for forming a fluid tight seal between the sump and the open end of said housing;

a shaft extending into said housing through an opening in the closed end thereof;

resilient sealing means forming a fluid tight seal between said shaft and said closed end of said housing while permitting axial and rotational movement of said shaft with respect to said closed end;

socket means connected to the end of said shaft within said housing for non-rotatably engaging said plug for removal thereof from said sump upon rotational movement of said shaft;

a flexible drain tube connected over an opening in said housing for draining said housing of fluid following removal of said plug from said sump, a yoke pivotably mounted to said housing for swinging movement about an axis extending in a direction transverse to the longitudinal axis of said shaft, tubular means carried by said yoke, said tubular means having an open end disposed in proximity to said yoke, and said drain tube extends into said open end of said tubular means.

2. The device according to claim 1 wherein said tubular means comprises a plurality of mutually interconnected, telescopic, tubular sections.

* * * * *